Figure 1:
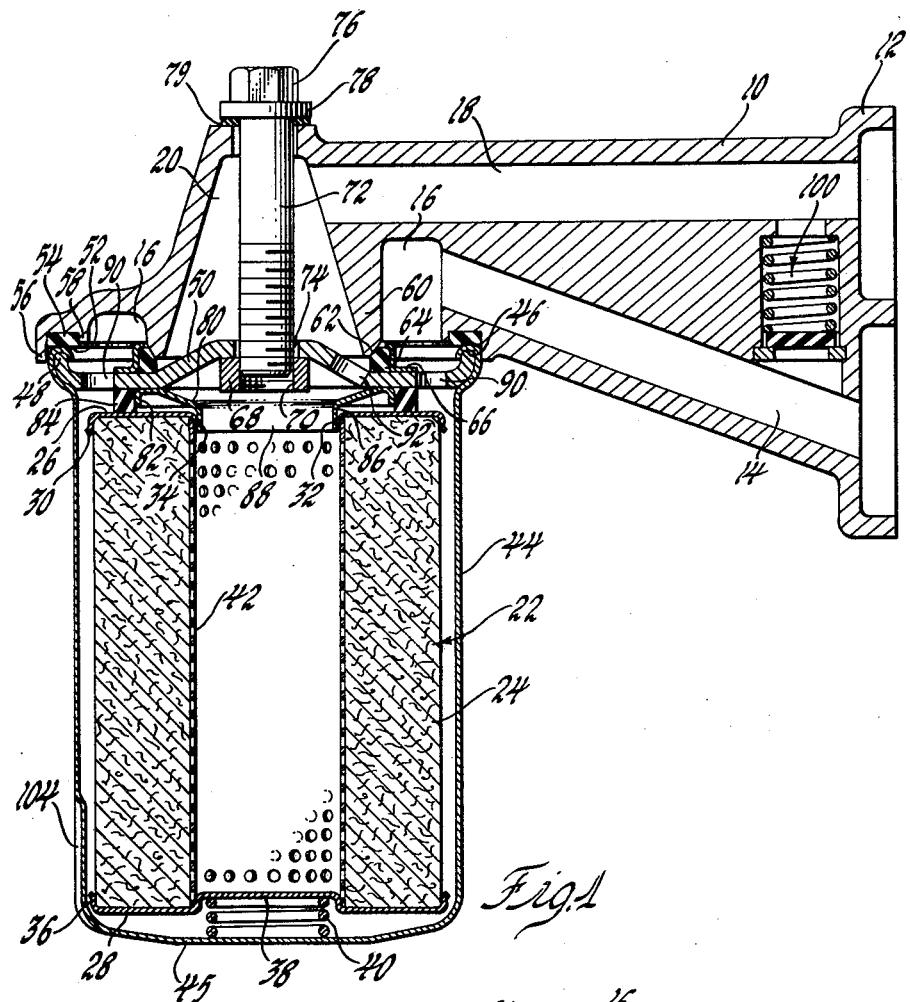

Dec. 11, 1962  R. L. BOWERS ET AL  3,067,880
OIL FILTER ASSEMBLIES
Filed Sept. 30, 1959

INVENTORS
Roy L. Bowers &
BY Harold W. Noponen
George E. Johnson
ATTORNEY

United States Patent Office 3,067,880
Patented Dec. 11, 1962

3,067,880
OIL FILTER ASSEMBLIES
Roy L. Bowers and Harold W. Noponen, Flint, Mich., assignors to General Motors Corporation, Detroit, Mich., a corporation of Delaware
Filed Sept. 30, 1959, Ser. No. 843,451
1 Claim. (Cl. 210—249)

This invention relates to filters for clarifying fluids and more particularly to oil filter assemblies including oil-supplying supports so constructed that replacement of the filter elements in the assemblies is facilitated.

Throw-away oil filter elements for automotive vehicles and for use in other fields as well may be exemplified by the disclosure in the United States Patent 2,210,213, granted August 6, 1940, in the name of James H. Long. Devices of this type have been cumbersome, costly or somewhat involved in structure and details such as seals provided for preventing leakage have not been as satisfactory as would be desirable.

An object of the present invention is to provide an improved and simple oil filter assembly of low cost which may conveniently be disassembled for replacement of the filter element.

To the above ends, a feature of the present invention is a fluid-supplying and withdrawal support having a single through-bolt holding a filter element and a container for the latter in sealed relation on the support. Another feature is an inturned margin on a filter element container, this margin being held in sealed contactual relation to a support to and from which fluid may be caused to flow by way of the element for clarification.

These and other important features of the invention will now be described in detail in the specification and then pointed out more particularly in the appended claims.

Figure 2:
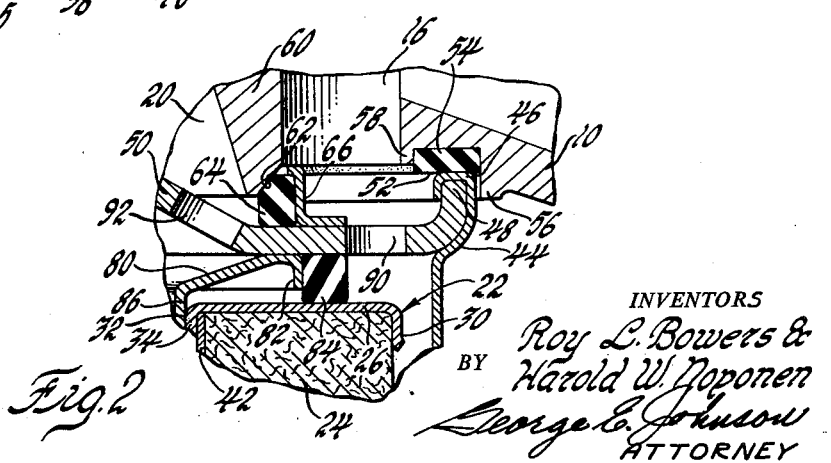

In the drawings:

FIGURE 1 is a sectional view through a filter assembly including a filter element with its container and a support for conducting fluid to and from the element; and FIGURE 2 is an enlarged fragmentary view of portions of the assembly shown in FIGURE 1.

The assembly includes a support or casting 10, one end of which is flanged as at 12 for receiving bolts (not shown) or other means of attachment to the side of an internal combustion engine block or crankcase. The support 10 includes an inlet passage 14 which communicates with an annular chamber 16. It will be noted in FIGURE 1 that the chamber 16 varies in height so that fuel may freely enter that chamber and be properly distributed therein. The support 10 includes an outlet passage 18 and also a frusto-conical chamber 20 coaxial with the chamber 16. The passage 18 connects with the chamber 20 so that fluid may be discharged through the support to the engine as will be understood.

The assembly includes a filter element generally indicated at 22. This element includes filter material 24 which may take the form of oil permeable paper or other substances suitable for removing contaminant from the oil or fluid being treated. The filter element 22 also includes two end plates 26 and 28. The end plate 26 is flanged as at 30 more firmly to retain the filter material 24. The plate 26 is also apertured as at 32 and bears an internal flange as at 34.

The other end plate 28 is in the form of a solid disk bearing an external flange 36 snugly retaining the filter material 24 and this disk is depressed as at 38 to form a seat for one end of a coiled spring 40. The flange 34 and the depressed portion 38 of the two end plates serve to position a perforated cylindrical tube 42 in the filter element. The various parts of the filter element 32 are generally joined in any conventional manner such as by the use of adhesive.

A container 44 is utilized to include the filter element 22. The container includes a thin-wall structure that is cup-like in configuration, its bottom 45 being solid or imperforate and its top margin being rolled over and directed inwardly as at 46 tightly to encompass the edge or up-turned margin 48 of a heavy walled end plate 50. The rolled margin 46 engages a sealing surface 52 of the support 10. This surface is on a sealing washer 54 held in a groove formed between two coaxial annular flanges 56 and 58 formed on the casting 10.

The frusto-conical chamber 20 and the annular chamber 16 are separated by an annular wall 60. This wall bears a beveled surface 62 which is engaged by a sealing washer 64. The latter is held in position on the heavy plate 50 by means of an annular ring 66. The latter is welded to the plate 50. Also welded to the plate 50 is a boss 68 threaded as at 70 to receive the end of a solid bolt 72. The plate 50 is apertured as at 74 freely to receive the bolt. The latter has a head 76 integral with a washer 78. A seal is provided between the washer 78 and the support 10 by means of a rubber washer 79.

An annular member 80 is welded to the heavy plate 50 and on the side of the latter opposite the sealing washer 64 it bears a flange 82 positioning an internal sealing washer or annular sealing means 84. It also bears an internal flange 86 which fits within the flange 34 of the filter element 22 and is apertured as at 88 to form an opening in registry with the opening 32 of the end plate 26.

An annular series of inlet ports 90 are formed in the heavy plate 50 between the ring 66 and the margin 48. These ports give communication between the annular inlet chamber 16 of the support 10 and the exterior surface of the filter element 22. A series of outlet ports 92 are formed in the heavy plate 50 giving communication between the openings 32 and 88 at the upper end of the filter element with the frusto-conical chamber 20 of the support.

A conventional spring and pressure actuated by-pass valve is generally indicated at 100. This valve arrangement is placed in the support 10 to give direct communication between the inlet passage 14 and the outlet passage 18 in the event the filter 22 becomes clogged.

The solid bolt 72 provides a means for providing adequate sealing pressure on the gaskets or rings 54 and 64. The spring 40 insures that the sealing ring 84 properly separates the contaminated fluid from the clarified fluid within the confines of the container 44. The latter is indented around its periphery as at 104 for a hand-hold during installation.

From the above, it will be seen that in operation oil entering from the engine by way of passage 14 passes into the annular chamber 16 and then into the container 44 to surround the filter element 22. This oil then passes through the filter material 24, into the tube 42 and then through the discharge ports 92 into the frusto-conical chamber 20. The oil, having been clarified by the filter element, is returned by way of the passage 18 to the engine lubricating system.

The attachment of the filter element 22 and its container 44 to the support 10 is such that release of the single bolt 72 detaches the filter element in its container. In attaching a new filter element in a new container 44, the margin 46 of the latter is pressed against the surface 52 of the washer 54 with guidance being provided by the flange 56 and the bolt 72 is tightened.

Because of the mode of attachment of the filter element and its container to the support, it is not necessary to turn one of these with respect to another during the attachment and therefore no scuffing or stress of the sealing washers 54 and 64 occurs. It should be particularly noted that the inturned margin 46 contacts a surface of the support and contributes a single seal between the contaminated oil flow and the atmosphere. The bolt 72 supplies a means of attachment which demands a minimum of space for the entire assembly.

We claim:

An oil filter assembly comprising a support adapted to be attached to an engine and defining an inlet passage leading to an inlet chamber, an outlet passage leading from an outlet chamber, with said inlet chamber surrounding said outlet chamber, said support being in combination with a cylindrical cup-like container of thin sheet material resistant to distortion and having an integral closed end, a unitary closure of relatively heavy material joined at its periphery to the other end of said container, a solid bolt extending through said support and said outlet chamber and into threaded engagement with said closure, a filter element in said container and comprising a perforated tube surrounded by filter material confined between two end plates, one of said end plates being adjacent to said closure and provided with a central aperture, coaxial sealing means in the form of three gaskets, one of said gaskets being interposed between the periphery of said container and said support, the second of said gaskets being interposed between said closure and said support to separate said inlet chamber from said outlet chamber, the third of said gaskets being interposed between said closure and said one end plate, unitary means coaxially locating said one end plate and third gasket within said container, a first port in said closure giving communication between said inlet chamber and said container outside said filter element and said third gasket, a second port in said closure giving communication between said perforated tube, said central aperture and said outlet chamber, and the arrangement being such that tightening of said bolt effects positive seals by said one and second gaskets for a fluid flow path from said inlet chamber through said first port to the exterior of said filter element and from the said perforated tube to said outlet chamber by way of said second port.

References Cited in the file of this patent
UNITED STATES PATENTS

| | | |
|---|---|---|
| 2,511,800 | Wilkinson | June 13, 1950 |
| 2,884,133 | Walulik et al. | Dec. 9, 1955 |
| 2,888,141 | Coates et al. | May 26, 1959 |